(12) United States Patent
Suresh et al.

(10) Patent No.: US 8,982,884 B2
(45) Date of Patent: Mar. 17, 2015

(54) SERIAL REPLICATION OF MULTICAST PACKETS

(75) Inventors: Maya Suresh, Santa Clara, CA (US);
Chien-Hsien Wu, Cupertino, CA (US);
Michael Lau, Rockville, MD (US);
Robert (Yi) Li, Fremont, CA (US);
Morris Beatty, Redwood City, CA (US)

(73) Assignee: Broadcom Corporation, Irvine, CA (US)

( * ) Notice: Subject to any disclaimer, the term of this patent is extended or adjusted under 35 U.S.C. 154(b) by 232 days.

(21) Appl. No.: 13/568,856

(22) Filed: Aug. 7, 2012

(65) Prior Publication Data
US 2014/0044128 A1 Feb. 13, 2014

(51) Int. Cl.
*H04L 12/56* (2006.01)

(52) U.S. Cl.
USPC ........................................................ 370/390

(58) Field of Classification Search
CPC ......... G06F 3/00; H04L 49/00; H04L 49/901; H04L 12/1881; H04L 49/201; H04L 49/104; H04L 49/90; H04L 12/5601
USPC ........................ 370/390, 428, 429, 432, 474
See application file for complete search history.

(56) References Cited

U.S. PATENT DOCUMENTS

| 2004/0008716 A1* | 1/2004 | Stiliadis | 370/429 |
| 2004/0264464 A1* | 12/2004 | Wong | 370/390 |
| 2010/0040085 A1* | 2/2010 | Olderdissen et al. | 370/474 |
| 2012/0320917 A1* | 12/2012 | Song | 370/390 |

* cited by examiner

*Primary Examiner* — Andrew Chriss
*Assistant Examiner* — Peter Mak
(74) *Attorney, Agent, or Firm* — Oblon, McClelland, Maier & Neustadt, L.L.P.

(57) ABSTRACT

Disclosed are various embodiments that provide serial replication of multicast packets by performing a first data fetch to fetch first data from a memory buffer, the first data comprising a first packet pointer representing a first packet and a replication number indication a number of times the first packet is to be replicated. Furthermore, various embodiments are directed to performing a second data fetch to fetch second data from a memory buffer, the second data comprising a first packet pointer representing a second packet and serially replicating the first packet and the second packet based at least in part upon the replication number and a predetermined threshold value.

17 Claims, 4 Drawing Sheets

SERIAL REPLICATION OF MULTICAST PACKETS

BACKGROUND

A network switch routes data from a source to a destination. For example, a network switch may receive data packets from a plurality of input ports and route these data packets to a plurality of output ports. As the demand for faster network speeds increases, network switches may be scaled accordingly to meet this increasing demand.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to serially replicating multicast packets and providing these replicated packets to the same or different output destination. Packets received at an input port of a network component may need to be replicated or otherwise logically duplicated for reproduction at one or more output ports. In this sense, a received packet may be a multicast packet such that the multicast packet is configured to be sent to one or more destination output ports.

It may be the case that replication time of a packet contributes to a significant portion of the packet processing latency. That is to say, the cost of replication time may need to be minimized to effectuate an optimizing network routing component.

One hardware implementation is to replicate packets in parallel. In this respect, each output port or output port set may have corresponding packet replication circuitry. To this end, packets may be replicated in parallel through the use of multiple replication engines. However, this implementation of parallel replication may result in utilizing large amounts of processing resources. For example, implementing parallel replication may lead to issues relating to circuit layout restrictions.

Various embodiments of the present disclosure are directed to serially replicating packets directed to one or more output ports. In this respect, a particular packet may be replicated many times over the course of sequential clock cycles and each replicated packet is directed to a different output port. Furthermore, more than one packet may be subject to serial replication during one clock cycle. To determine whether a plurality of packets may be replicated during the same clock cycle, the number of scheduled replications for a packet may be analyzed. Replication information may be stored along with packet pointer information. In the following discussion, a general description of the system and its components is provided, followed by a discussion of the operation of the same.

Figure 1:
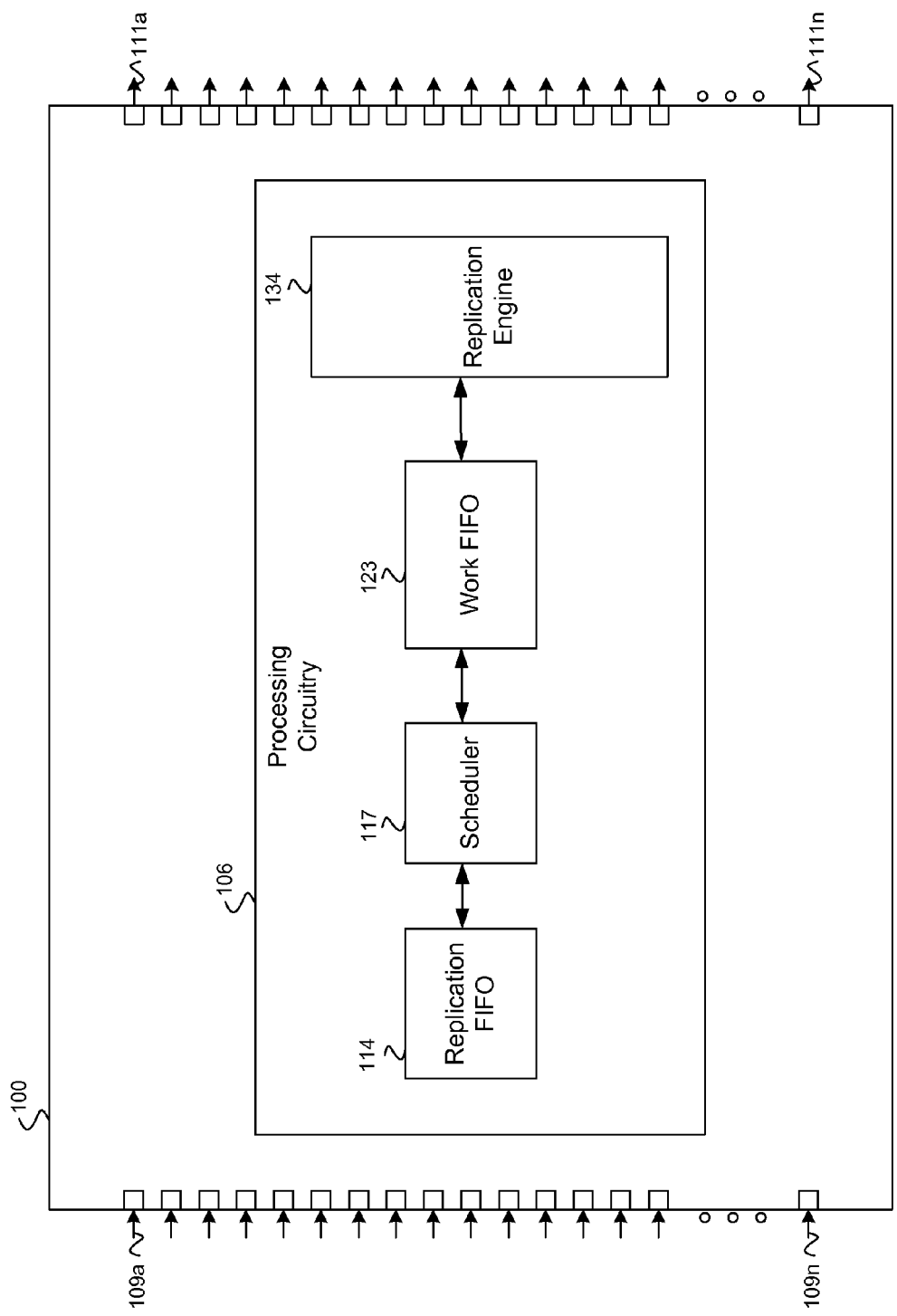
FIG. 1 is a drawing of a network component according to various embodiments of the present disclosure.

With reference to FIG. 1, shown is a network component 100 according to various embodiments. The computing device 100 may correspond to a switch, a router, a hub, a bridge, or any other network device that is configured to facilitate the routing of network packets. The network component 100 is configured to receive one or more packets from a source and route these packets to one or more destinations. For example, the network component 100 may comprise one or more input ports 109*a-n*. Each input port 109*a-n* is configured to receive a network packet. The network component 100 also comprises a plurality of output ports 111*a-n*.

Incoming packets, such as those packets received by the input ports 109*a-n*, are processed by processing circuitry 106. In various embodiments, the processing circuitry 106 is implemented as at least a portion of a microprocessor. The processing circuitry 106 may include one or more circuits, one or more microprocessors, application specific integrated circuits, dedicated hardware, or any combination thereof. In yet other embodiments, processing circuitry 106 may include one or more software modules executable within one or more processing circuits. The processing circuitry 106 may further include memory configured to store instructions and/or code that causes the processing circuitry to execute data communication functions.

In various embodiments the processing circuitry 106 may be configured to prioritize, schedule, or otherwise facilitate routing incoming packets to one or more output ports 111*a*-111*n*. The processing circuitry 106 may comprise various components such as, for example, a replication first in first out buffer (FIFO) 114, a scheduler 117, a work FIFO 123, and a replication engine 134.

In various embodiments, the replication FIFO 114 is a memory buffer configured to absorb bursts of incoming packets. That is to say, packets received through one or more input ports 109*a-n* are stored in the replication FIFO until the incoming packets are replicated. Packets stored in the replication FIFO 114 may be stored in various priority queues to facilitate packet prioritization, quality of service, class of service, or any other prioritization scheme. The scheduler 117 may be configured to support various prioritization schemes to effectuate packet prioritization. In various embodiments, the scheduler selects one of the plurality of prioritization queues of the replication FIFO 114 based on prioritization decisions.

The processing circuitry 106 also comprises a work FIFO 123. The work FIFO 123 may be a memory buffer that stores packet pointers corresponding to respective packets stored in the replication FIFO 114. In various embodiments, the work FIFO 123 stores a packet pointer of a packet along with replication information associated with the same packet. This may assist in the replication of the packets stored in the replication FIFO 114.

The replication engine 134 is configured to serially replicate incoming packets to generate replicated packets. Furthermore, the replication engine 134 may send replicated packets to one or more output ports 111*a-n*. The replication engine 134 may be in data communication with the work FIFO 123 to obtain information about packet replication. To this end, the replication engine 134 logically duplicates packets based at least upon data stored in the work FIFO 123.

Figure 2:
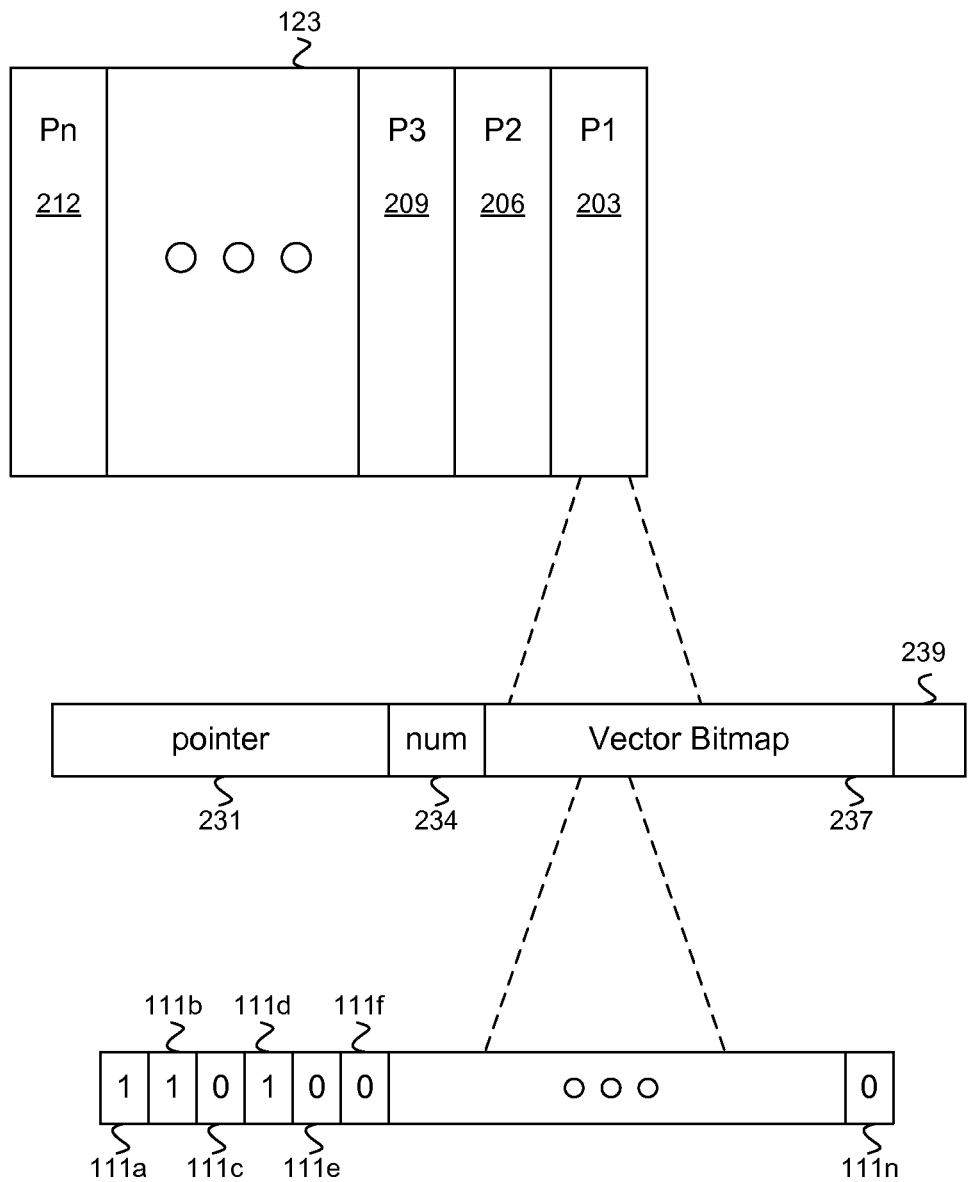
FIG. 2 is a drawing of an example of data stored in the network component of FIG. 1 according to various embodiments of the present disclosure.

Turning now to FIG. 2, shown is a drawing of an example of data stored in the network component of FIG. 1 according to various embodiments of the present disclosure. The processing circuitry 106 (FIG. 1) of the network component 100 (FIG. 1) may comprise a work FIFO 123. The work FIFO 123 may store packet information 203, 206, 209, 212, corresponding to respective packets. For example, the packet information for one received packet, P1, may be stored as first data 203. Similarly, the packet information for a second received packet, P2, may be stored as second data 206, etc.

Each piece of packet information 203, 206, 209, 212 may comprise a packet pointer 231, a number of replications 234, a vector bitmap 237, or any other packet information 239. For example, the first data 203 includes a packet pointer 231 that references a packet stored in a separate memory such as, for example, a replication FIFO 114 (FIG. 1). A packet pointer 231 may be any identifier such as, for example, a buffer address that references a packet received at one of the input ports 109*a-n* of the network component 100. In various embodiments, packet pointers 231 require less memory space than the corresponding packet referenced by the pointer 231.

Additionally, each piece of packet information 203, 206, 209, 212 may include a respective replication number 234. For example, the first data 203, which references a particular packet by way of a packet pointer 231, may include a number of replications 234 that is to be performed on the particular packet. For instance, a first packet is received by the network component 100 at an input port 109*a-n*. The first packet may be stored in a memory within the network component 100. Packet information for that packet is stored as first data 203 in the work FIFO 123. Furthermore, in this example, the first packet is to be replicated five times. That is to say, five logical copies must be generated such that five different output ports 111*a-n* each receive a replication of the first packet. Accordingly, the replication number 234 for the first packet, in this example, is five.

In various embodiments, the replication number 234 is a remaining number of replications. The processing circuitry 106 initially determines a total number of replications that must be made for a particular packet. If some of the replications were made during a previous clock cycle, then there might be a number of replications remaining for subsequent clock cycles. Thus, a replication number 234 may indicate how many more replications need to be generated when a portion of the total number of replications have been previously generated.

Moreover, each piece of packet information 203, 206, 209, 212 may further comprise a respective vector bitmap 237. In various embodiments, a vector bitmap 237 is a list of the output ports 111*a-n* that are scheduled to receive a replicated packet. In this respect, the vector bitmap 237 specifies which output ports 111*a-n* are to receive a particular replicated packet and which output ports 111*a-n* are not to receive the particular replicated packet. In various embodiments, a binary designator such as 1 or 0 may specify which output ports 111*a-n* are to receive a replicated packet. In the example of FIG. 2, the vector bitmap 237 of a first packet P1 specifies that replicated versions of P1 are to be sent to a first output port 111*a*, a second output port 111*b*, and a fourth output port 111*d*. Additionally, because the vector bitmap 237 identifies which output ports 111*a-n* are to receive a replicated packet, the vector bitmap inherently expresses the total number of replications scheduled for the corresponding packet over the course of one or more clock cycles.

FIG. 2 additionally depicts an example of a work FIFO 123 that stores packet information 203, 206, 209, 212 in a queue. Each piece of packet information 203, 206, 209, 212 corresponds to a packet received by the network component 100. The work FIFO 123 may be organized by storing packets in order of priority of replication. To this end, a first packet P1 that is referenced in the work FIFO 123 is the next packet to be replicated or alternatively is the current packet that is subject to replication. A second packet P2 is processed after the first packet P1, and a third packet P3 is processed after the second packet P2. When replication of a particular packet is complete, the work FIFO 123 discards the packet information associated for the particular packet and updates the FIFO queue. For example, after the first packet P1 is completely replicated, the first data 203 associated with the first packet P1 is removed from the work FIFO 123. Then the second packet P2 is next in the queue for serial replication.

In various embodiments, a replication engine 134 (FIG. 1) is in data communication with the work FIFO 123. The replication engine 134 may be configured to fetch each piece of packet information 203, 206, 209, 212 in an order organized by the work FIFO 123. To this end, the work FIFO 123 provides a prioritization of packets to be replicated along with replication information such as the a packet pointer 231, a replication number 234, a vector bitmap 237, and any other information 239 needed to replicate the target packet. Moreover, the replication information stored for each packet may be accessed by the replication engine 134 to allow the replication engine 134 to determine whether more than one packet may be subject to replication during a single clock cycle.

Figure 3:
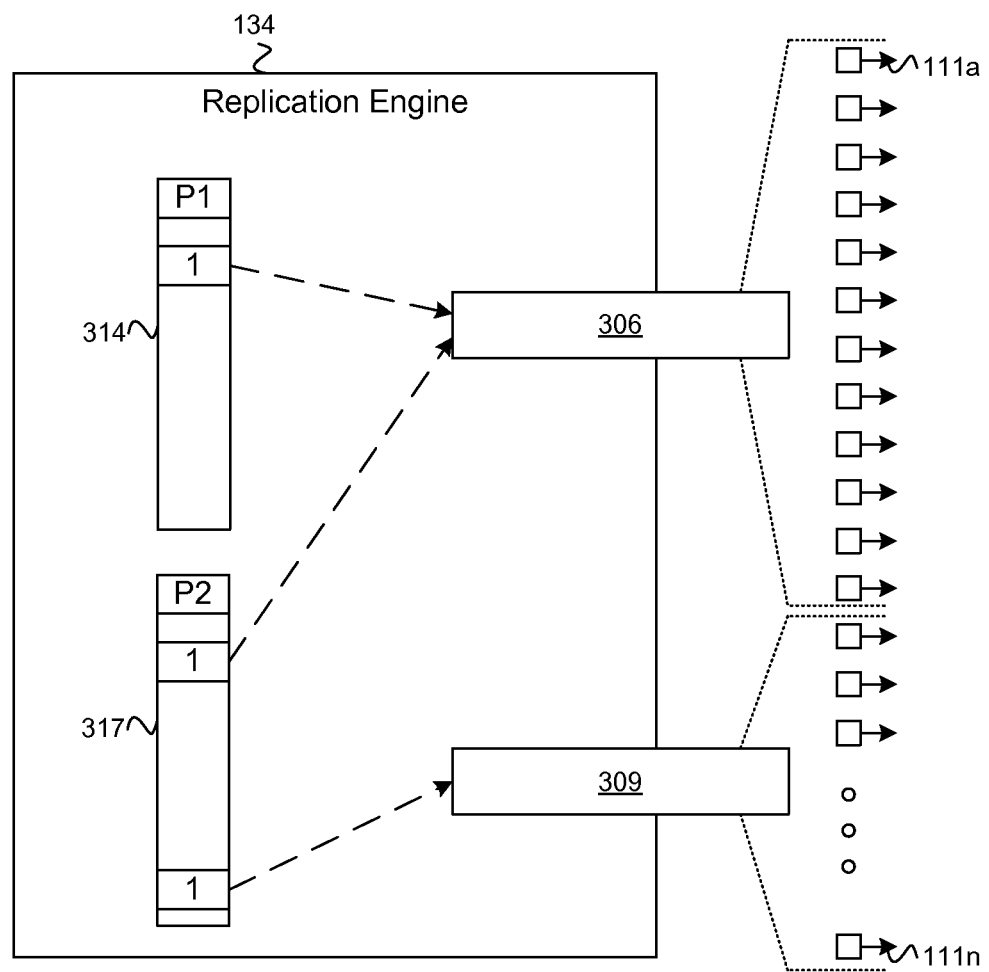
FIG. 3 is a drawing of an example of data communication in the network component of FIG. 1 according to various embodiments of the present disclosure.

Moving to FIG. 3, shown is a drawing of an example of data communication in the network component of FIG. 1 according to various embodiments of the present disclosure. FIG. 3 provides a non-limiting example of the functionality of a replication engine 134 executed as a portion of processing circuitry 106 (FIG. 1) of a network component 100 (FIG. 1). For example, FIG. 3 demonstrates various embodiments directed to the manner in which a replication engine 134 fetches packet information from a work FIFO 123 (FIG. 1) and generates one or more replications of a packet referenced by the fetched packet information. Packet information, for example, may comprise a vector bitmap 314, 317. The replication engine 134 may fetch packet information referencing a first packet P1. The packet information is at least a vector bitmap 314 for the first packet P1. The replication engine 134 may also fetch packet information referencing a second packet P2. The packet information is at least a vector bitmap 317 for the second packet P2.

Furthermore, FIG. 3 also demonstrates various embodiments directed to how replicated packets are sent to one or more output ports 111*a-n*. For example the output ports 111*a-n* may be divided into port sets. Each port set comprises a respective constituent portion of the output ports 111*a-n*. In one embodiment, among others, a first half of the output ports 111*a-n* comprises a first port set and a lower half of the output ports 111*a-n* may comprise a second port set. Each port set is communicatively coupled to the processing circuitry 106 via a bus. For example, a first bus 306 may provide data access between the processing circuitry 106 and the first port set and a second bus 209 may provide data access between the processing circuitry 106 and the second port set.

In various embodiments of the present disclosure, each bus 306, 309 may be written to at least once per clock cycle. However, it may be the case that each bus has a physical limit on the number of writes it may handle per clock cycle. Thus, the number of replications during a single clock cycle of one or more packets is limited by a maximum number of replicated packets than may be written to a set of buses 306, 309.

The replication engine 134 of FIG. 3 may begin by fetching first data from the work FIFO 123. In this example, the replication engine 134 accesses the first entry in the queue of the work FIFO 123. This first data may represent packet information of a first packet P1. Although the first packet P1 is referenced by the first data, the first packet P1 itself may be stored in a memory component other than the work FIFO 123.

In various embodiments, after the replication engine 134 fetches the first data, the replication engine 134 analyzes the first data. For example, the replication engine 134 determines a replication number 234 (FIG. 2) for the first packet P1. The replication number 234 may indicate a number of replications that must be performed. In other words, the replication number 234 reflects the number of outputs that must receive a replication of the first packet P1.

The replication number 234 may be compared to a predetermined threshold value. For example, if this number is low such that the replication number 234 falls below a predetermined threshold value, then the replication engine 134 may be configured to consider replicating the first packet P1 along with the next packet in the queue of the work FIFO 123, during a single clock cycle. In this respect, the replication engine 134 serially replicates packets in a sequence reflected by the queue of work FIFO 123. Furthermore, the replication engine 134 determines whether more than one packet may be replicated in a single clock cycle.

As a non-limiting example, the replication engine 134 may determine that the replication number 234 for the first packet P1 exceeds a predetermined threshold value. In this example, the replication engine 134 determines that only the first packet P1 will be subject to replication during the clock cycle. In this case, the replication engine refrains from replicating a next packet P2. Due to hardware limitations, there may be a maximum number of replications that are performed in parallel. Based on these limitations, a predetermined threshold value may be set. For example, if the predetermined threshold value is two and the first data associated with the first packet P1 indicates that a total eight replications are required, then the replication engine 134 may perform a replication of only the first packet P1 for a given clock cycle. Furthermore, in this example, if the replication engine 134 is able to perform two replications during a particular clock cycle, then only six more replications are required. The replication number 234 stored in the work FIFO 123 may be updated to a value of six to reflect a remaining number of replications.

Embodiments of the present disclosure that are directed to determining whether a value is less than a predetermined threshold value merely provide examples of one implementation. Similar results may be achieved using alternative implementations of comparing a value against a predetermined threshold value.

In various embodiments, the replication engine 234 is configured to serially replicate a packet over the course of a plurality of clock cycles. At least one replication takes place for each clock cycle. The first data fetched by the replication engine 234 may comprise a vector bitmap 314 associated with the first packet P1. According to this vector bitmap 314, the replication engine 234 may serially replicate packets in an order delineated by the vector bitmap 314. If, for example, the vector bitmap 314 specifies that twelve output ports are scheduled to receive the replicated packet associated with the vector bitmap 314, then the replication engine 134 may perform a replication of the first packet P1 during a first clock cycle to cover a portion of the twelve output ports. On the second clock cycle, the replication engine 134 may perform another replication during the second clock cycle to cover another portion of the twelve output ports. Thus, the replication engine 134 may iteratively replicate the first packet P1 in a serial manner over the course of many clock cycles until the first packet is completely replicated and sent to the twelve output ports 111a-n specified by the vector bitmap 314.

Moreover, for each iteration of a given clock cycle, the replication number 234 associated with the packet may be updated to reflect the number of replications remaining.

The replication number 234 may fall below a predetermined threshold value. This case may arise when a packet is near completion of serial replication. This case may also arise when a packet initially has few replications. In any case, when the replication number 234 falls below a predetermined threshold value, the replication engine 134 is signaled to complete replicating a first packet P1 during a particular clock cycle and begin replicating a second packet P2 during the particular clock cycle.

FIG. 3 provides an example of a replication engine 134 that processes a first packet P1 and processes a second packet P2 during the same clock cycle. In this example, the replication engine 134 fetches first data from a work FIFO 123. The first data comprises a packet pointer 231 (FIG. 2) for referencing or otherwise locating the first packet P1, a replication number 234 indicating the number of replications required to route the first packet P1 to one or more output ports 111a-n, and a vector bitmap 314 for the first packet P1. The replication engine may also fetch second data from the work FIFO 123 based on the next item in a work FIFO queue. The second data comprises a packet pointer 231 for referencing or otherwise locating the second packet P2, a replication number 234 indicating the number of replications required to route the second packet P2 to one or more output ports 111a-n, and a vector bitmap 317 for the second packet P1. When the replication number 234 of the first packet P1 falls below a predetermined threshold value, the replication engine 134 may complete replication of the first packet P2 during a particular clock cycle and at least begin replication of the second packet P2 on the same clock cycle. In order to serially replicate two packets on the same clock cycle, the replication engine 134 may access the two packets using respective packet pointers 231 to locate the two corresponding packets. Additionally, the replication engine 134 may also use the respective vector bitmaps 314, 317 to determine which output ports are scheduled to receive replicated versions of the first packet P1 and replicated versions of the second packet P2.

In the example of FIG. 3, the replication engine 134 determines that the first packet P1 requires a single replication. Furthermore, the replication engine 134 may determine the specific output port 111a-n by analyzing the vector bitmap 314 associated with the first packet. During a particular clock cycle, the replication engine 134 may replicate the first packet P1 based at least in part upon the packet pointer 231 fetched from the work FIFO 123. Furthermore, in this example, the determined output port 111a-n is part of a port set associated with a first bus 306. Thus, the replication engine 134 may replicate the first packet P1 and send the replicated first packet to the determined output port 111a-n by way of the first bus 306.

Furthermore, in the example above, the replication engine 134 may determine that it can also process a second packet P2 during the same clock cycle. The replication engine 134 makes this determination by analyzing the replication number 234 of the first packet P1, which, in this case, is one. When processing the second packet P2, the replication engine 134 determines that the vector bitmap 317 associated with the second packet P2 specifies that two particular output ports 111a-n are each scheduled to receive a replicated second packet P2. To this end, the second packet P2 requires two replications. As seen in the example of FIG. 3, one of the particular output ports 111a-n for the replicated second packet P2 is accessible via the first bus 306 while the other particular output port 111a-n is accessible via the second bus

309. That is to say, the output ports 111*a-n* specified in the vector bitmap 317 of the second packet P2 regard two different port sets. Thus, the replication engine 134, with regard to the second packet P2, may write to the first bus 306 and write to the second bus 309 during a particular clock cycle. Furthermore, the replication engine 134, with regard to the first packet P1, may also write to the first bus 306 during the particular clock cycle.

In various embodiments of the present disclosure, each bus 306, 309 may be written to at least once per clock cycle. However, it may be the case that each bus has a physical limit on the number of writes it may handle per clock cycle. In the example of FIG. 3, the network component 100 divides the output ports 111*a-n* into two port sets, each port set having a dedicated bus 306, 309. Furthermore, in this example, each bus may be written to at a maximum of two writes per clock cycle. To this end, to achieve maximum efficiency, in this example, four serial replications may occur in one clock cycle-two per bus.

Figure 4:
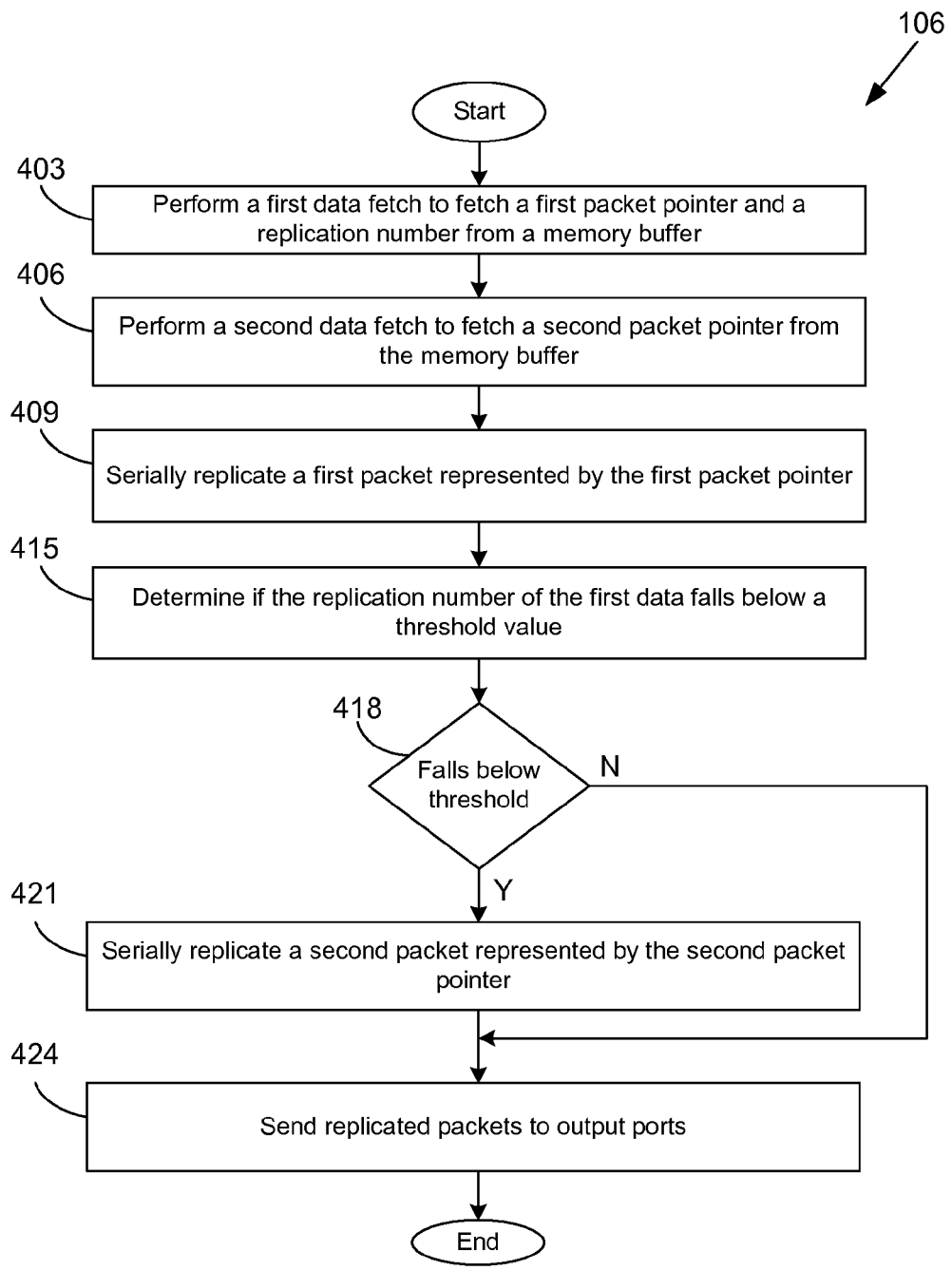
FIG. 4 is a flowchart illustrating one example of functionality implemented as portions of processing circuitry in the network component of FIG. 1 according to various embodiments of the present disclosure.

Turning now to FIG. 4, shown is a flowchart that provides one example of the operation of a portion of the logic executed by the processing circuitry 106 according to various embodiments. It is understood that the flowchart of FIG. 4 provides merely an example of the many different types of functional arrangements that may be employed to implement the operation of the portion of the logic executed by the processing circuitry 106 as described herein. As an alternative, the flowchart of FIG. 4 may be viewed as depicting an example of steps of a method implemented in the processing circuitry 106 according to one or more embodiments.

Beginning with block 403, the processing circuitry 106 performs a first data fetch to fetch a first packet pointer 231 (FIG. 2) and a replication number 234 (FIG. 2) from a memory buffer. The memory buffer, for example may be a work FIFO 123 (FIG. 1). The first packet pointer 231 may reference a first packet or may identify a location of a first packet. In various embodiments, the first packet is stored in a replication FIFO 114. The replication number 234 may indicate a number output ports 111*a-n* (FIG. 1) that are scheduled to receive a replicated version of the first packet. The replication number 234 may also indicate a remaining number of replications that must occur in order to complete the routing of the first packet to one or more output ports 111*a-n*.

In various embodiments, the first data fetched by the processing circuitry 106 further includes a vector bitmap. The vector bitmap specifies which output ports 111*a-n* are scheduled to receive the replicated versions of the first packet. Thus, the vector bitmap may express a total number of replications the first packet is to be replicated. In this example, the remaining number of replications does not exceed the total number of replications. In this respect, over the course of a plurality clock cycles, as a packet is being serially replicated, the number of remaining replications reduces as each clock cycle passes When there are not remaining replications left, the packet is deemed completely replicated and the processes starts over again with the next packet in queue.

In block 406, the processing circuitry 106 performs a second data fetch to fetch a second packet pointer 231 from the memory buffer. In various embodiments, the first data fetch and the second data fetch occur during the same clock cycle to achieve a fast serial replication process. The second packet pointer 231 may reference a second packet stored in another memory.

In block 409, the processing circuitry 106 serially replicates the first packet represented by the first packet pointer. The processing circuitry 106 performs the replication in a particular clock cycle. The processing circuitry 106 may employ a replication engine 134 (FIG. 1) to facilitate the replication of the first packet.

In block 415, the processing circuitry 106 determines if the replication number 234 of the first data falls below a predetermined threshold value. For example, the processing circuitry 106 analyzes whether a second packet may be replicated during the particular clock cycle based on the workload of replicated the first packet. If the replication number 234 does not fall below a predetermined threshold value, as seen in block 418, the processing circuitry 106 refrains from processing the second packet in the particular clock cycle.

Embodiments of the present disclosure that are directed to determining whether a value is not less than a predetermined threshold value merely provide examples of one implementation. Similar results may be achieved using alternative implementations of comparing a value against a predetermined threshold value.

However, if the replication number 234 does fall below the predetermined threshold value, then, as seen in block 421, the processing circuitry 106 serially replicates the second packet represented by the second packet pointer. For example, the processing circuitry 106 may serially replicate the first packet and the second packet in the same clock cycle when the replication number 234 of the first packet is below a predetermined threshold value. By serially replicating the first and second packets, the processing circuitry 106 logically duplicates the first packet and the second packet to generate at least one first replicated packet and at least one second replicated packet.

In block 424, the processing circuitry 106 sends the replicated packets to output ports. The first replicated packets and the second replicated packets are sent to respective output ports.

The processing circuitry 106 and other various systems described herein may be embodied in software or code executed by general purpose hardware. As an alternative, the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 4 shows the functionality and operation of an implementation of portions of the processing circuitry 106 implemented by the network component 100 (FIG. 1). If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flowchart of FIG. 4 shows a specific order of execution, it is understood that the order of execution may differ from that which is depicted. For example, the order of execution of two or more blocks may be scrambled relative to the order shown. Also, two or more blocks shown in succession in FIG. 4 may be executed concurrently or with partial concurrence. Further, in some embodiments, one or more of the blocks shown in FIG. 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the replication FIFO 114 (FIG. 1), the scheduler 117 (FIG. 1), the work FIFO 123, and the replication engine 134 (FIG. 1), that comprises software or code can be embodied in any non-transitory computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, at least the following is claimed:

1. A system comprising:
a memory buffer; and
processing circuitry configured to:
store in the memory buffer a first packet pointer, the first packet pointer representing a first packet;
store in the memory buffer a first replication number, the first replication number indicating a number of times the first packet is to be replicated;
store in the memory buffer a second packet pointer, the second packet pointer representing the second packet;
store in the memory buffer a second replication number, the second replication number indicating a number of times the second packet is to be replicated;
serially replicate the first packet during a clock cycle according to the first packet pointer to generate at least one first replicated packet;
serially replicate the second packet, during the clock cycle, based at least upon the second packet pointer, if the first replication number falls below a predetermined threshold value.

2. The processing circuitry of claim 1, wherein the processing circuitry is further configured to store in the memory buffer, a vector bitmap, the vector bitmap indicating which ones of a plurality of output ports are scheduled to receive the at least one first replicated packet.

3. The processing circuitry of claim 2, wherein the vector bitmap expresses a total number of replications, the total number of replications indicating a total number of times the first packet is to be replicated.

4. The processing circuitry of claim 3, wherein the first replication number is a remaining number of replications, the remaining number of replications being less than the total number of replications.

5. The processing circuitry of claim 1, wherein the processing circuitry is further configured to schedule writing the first packet pointer and second packet pointer to the memory buffer based at least upon a prioritization of the first packet and the second packet.

6. The processing circuitry of claim 1, wherein the processing circuitry is further configured to refrain from serially replicating the second packet if the first replication number exceeds the predetermined threshold value.

7. The processing circuitry of claim 1, wherein the at least one first replicated packet comprises a plurality of first replicated packets, and the processing circuitry is further configured to:
store in the memory buffer, a vector bitmap, the vector bitmap indicating which ones of a plurality of output ports are scheduled to receive respective ones of the plurality of first replicated packets;
serially replicate the first packet during the clock cycle to generate the plurality of first replicated packets; and
send the plurality of first replicated packets to a subset of output ports according to the vector bitmap which ones of a plurality of output ports are scheduled to receive the at least one first replicated packet.

8. A method comprising:
performing a first data fetch to fetch first data from a memory buffer, the first data comprising a first packet pointer representing a first packet and a replication number indication a number of times the first packet is to be replicated;
performing a second data fetch to fetch second data from a memory buffer, the second data comprising a second packet pointer representing a second packet; and
serially replicating the first packet and the second packet based at least in part upon the replication number and a predetermined threshold value during a clock cycle.

9. The method of claim 8, wherein serially replicating the first packet and the second packet comprises logically duplicating the first packet and the second packet to generate at least one first replicated packet and at least one second replicated packet.

10. The method of claim 9, wherein serially replicating the first packet and the second packet further comprises sending the at least one first replicated packet and the at least one second replicated packet to respective output ports of a plurality of output ports.

11. The method of claim 10, wherein the first data further comprises a vector bitmap, the vector bitmap indicating which ones of the plurality of output ports are scheduled to receive the at least one first replicated packet.

12. The method of claim 11, wherein the vector bitmap expresses a total number of replications the first packet is to be replicated, wherein the number of replications is a remaining number of replications, the remaining number of replications being less than the total number of replications.

13. A system comprising:
   a memory buffer configured to store a first replication number, the first replication number indicating a number of times a first packet is to be replicated, and a second replication number, the second replication number indicating a number of times the second packet is to be replicated;
   a plurality of output ports, each output port configured to receive a first replicated packet and a second replicated packet; and
   circuitry configured to generate at least one first replicated packet and at least one second replicated packet during the same clock cycle based at least upon the first replication number.

14. The system of claim 13, wherein the memory buffer is further configured to store a vector bitmap, the vector bitmap indicated which of the plurality of output ports are scheduled to receive the at least one first replicated packet.

15. The system of claim 14, wherein the circuitry is further configured to direct, during a clock cycle, the at least one first replicated packet and the at least one second replicated packet to a respective ones of the plurality of output ports.

16. The system of claim 15, wherein the circuitry comprises a plurality of buses, each bus being dedicated to a respective set of the plurality of output ports.

17. The system of claim 16, wherein the circuitry is further configured to direct, during the clock cycle, the at least one first replicated packet and the at least one second replicated packet to a respective ones of the plurality of output ports via one of the plurality of buses.

* * * * *